United States Patent
Wang et al.

(10) Patent No.: US 11,475,597 B1
(45) Date of Patent: Oct. 18, 2022

(54) CALIBRATING DEVICE AND CALIBRATING METHOD OF CALIBRATING REAL-TIME IMAGE THROUGH DITHERING PROCESS

(71) Applicant: ML TECHNOLOGY LTD., New Taipei (TW)

(72) Inventors: Chang-Yu Wang, New Taipei (TW); Ying-Chang Tseng, New Taipei (TW); Ching-Hung Liang, New Taipei (TW); Chia-Liang Hsu, New Taipei (TW)

(73) Assignee: ML TECHNOLOGY LTD., New Taipei (TW)

( * ) Notice: Subject to any disclaimer, the term of this patent is extended or adjusted under 35 U.S.C. 154(b) by 0 days.

(21) Appl. No.: 17/536,063

(22) Filed: Nov. 28, 2021

(30) Foreign Application Priority Data

Sep. 14, 2021 (TW) ................................. 110134267

(51) Int. Cl.
*G06T 7/80* (2017.01)
*H04N 5/357* (2011.01)
*H04N 5/217* (2011.01)

(52) U.S. Cl.
CPC .............. *G06T 7/80* (2017.01); *H04N 5/2178* (2013.01); *H04N 5/357* (2013.01)

(58) Field of Classification Search
CPC ..................................................... H04N 5/357
See application file for complete search history.

(56) References Cited

U.S. PATENT DOCUMENTS

| 9,792,684 | B2 * | 10/2017 | Martin | H04N 17/002 |
| 9,805,442 | B2 * | 10/2017 | MacInnis | H04N 19/152 |
| 2004/0001608 | A1 | 1/2004 | Rhoads | |
| 2006/0056728 | A1 | 3/2006 | Silverbrook et al. | |
| 2008/0063304 | A1 * | 3/2008 | Russak | A61B 6/12 382/298 |
| 2012/0054191 | A1 * | 3/2012 | Boufounos | G06F 16/9014 707/741 |
| 2013/0121405 | A1 * | 5/2013 | Boufounos | G06T 9/008 375/240.03 |
| 2017/0220913 | A1 * | 8/2017 | Miyadera | H04N 1/40068 |
| 2022/0182589 | A1 * | 6/2022 | Sun | G06T 5/40 |

OTHER PUBLICATIONS

Office Action dated May 10, 2022 of the corresponding Taiwan patent application No. 110134267.

* cited by examiner

*Primary Examiner* — Brian P Yenke
(74) *Attorney, Agent, or Firm* — Chun-Ming Shih; HDLS IPR Services

(57) ABSTRACT

A calibrating device of calibrating a real-time image through a dithering process including a receiving unit, a storing unit, a displacing module, a computing module, and an outputting unit is disclosed. The receiving unit receives a real-time image from an image sensor and records a time parameter of the image. The storing unit stores a hash table that records multiple hash values used to calibrate the image. The displacing module shifts the multiple hash values in the hash table to generate an adjusted hash table. The computing module obtains a corresponding hash value from the adjusted hash table for each pixel point of the image in accordance with the coordinates of each pixel point, and respectively adds the corresponding hash value to the pixel value of each pixel point of the image to generate a calibrated image. The outputting unit outputs the calibrated image.

10 Claims, 5 Drawing Sheets

CALIBRATING DEVICE AND CALIBRATING METHOD OF CALIBRATING REAL-TIME IMAGE THROUGH DITHERING PROCESS

BACKGROUND OF THE DISCLOSURE

Technical Field

The present disclosure relates to a calibration to an image, and specifically relates to a calibrating device and a calibrating method of calibrating a real-time image through a dithering process.

Description of Related Art

Generally, images may produce quantization error after being transformed between high resolutions and low resolutions. For users, the images after transformation may appear visual fault(s), which may be seen inconsistently.

For example, if the color depth of an original image is six bits, and the color depth of a displayer used to output images is eight bits, the original image may be upgraded from six bits to eight bits in order to compel with the specification of the displayer. Similarly, if the color depth of the original image is ten bits, and the color depth of the displayer is eight bits, the original image may be downgraded from ten bits to eight bits in order to compel with the specification of the displayer. After the transformation (e.g., upgrading or downgrading), however, the images may produce the aforementioned quantization error.

Please refer to FIG. 1, which is a schematic diagram showing a banding effect. As shown in FIG. 1, when an original image 1 is processed to increase or decrease the number of bits, a transformed image 2 may be generated. When looking at the transformed image 2 through bare eyes, a user may see visual fault(s) 21 caused in accordance with the banding effect on the transformed image 2. In other words, the visual fault(s) 21 are generated because of the quantization error mentioned above.

In order to smooth the image after being upgraded/downgraded, the upgraded image/downgraded image needs to be further processed.

SUMMARY OF THE DISCLOSURE

The present disclosure is directed to a calibrating device and a calibrating method of calibrating a real-time image through a dithering process, which may add hash value(s) randomly generated to multiple pixel points of the image, so as to solve the quantization error produced of the image after the image is transformed between high resolutions and low resolutions.

In one of the exemplary embodiments, the calibrating device includes:
  a receiving unit, connected with an image sensor, configured to receive the real-time image from the image sensor and record a time parameter of the real-time image;
  a storing unit, stored a hash table, wherein the hash table records multiple hash values used to calibrate multiple pixel points of the real-time image;
  a processor, connected with the receiving unit and the storing unit, comprising:
    a displacing module, configured to shift the multiple hash values in the hash table in accordance with the time parameter to generate an adjusted hash table; and
    a computing module, configured to respectively obtain a corresponding one of the hash values from a corresponding grid of the adjusted hash table for each pixel point of the real-time image in accordance with a coordinates of each pixel point, and respectively add the corresponding one of the hash values to a lowest bit of a pixel value of each pixel point to generate a calibrated image; and
  an outputting unit, connected with the processor, configured to output the calibrated image.

In one of the exemplary embodiments, the calibrating method includes:
  a) obtaining the real-time image through an image sensor and recording a time parameter of the real-time image;
  b) reading a hash table, wherein the hash table records multiple hash values used to calibrate multiple pixel points of the real-time image;
  c) shifting the multiple hash values in the hash table in accordance with the time parameter to generate an adjusted hash table;
  d) respectively obtaining a corresponding one of the hash values from a corresponding grid of the adjusted hash table respectively for each pixel point of the real-time image in accordance with a coordinates of each pixel point;
  e) respectively adding the corresponding one of the hash values to a lowest bit of a pixel value of each of the pixel points to generate a calibrated image; and
  f) outputting the calibrated image.

The disclosed solution may adjust the hash table in accordance with the time parameter of the image, obtain the hash values correspondingly from the adjusted hash table, and calibrate each of the pixel points of the image through each corresponding hash value. Therefore, same pixel point of the sequential images may be prevented from adding same hash value thereto, and the dithering process used by the disclosure may be prevented from a reduced calibrating effect. As a result, the sequential images may be visually smooth in human's eyes.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

Figure 2:
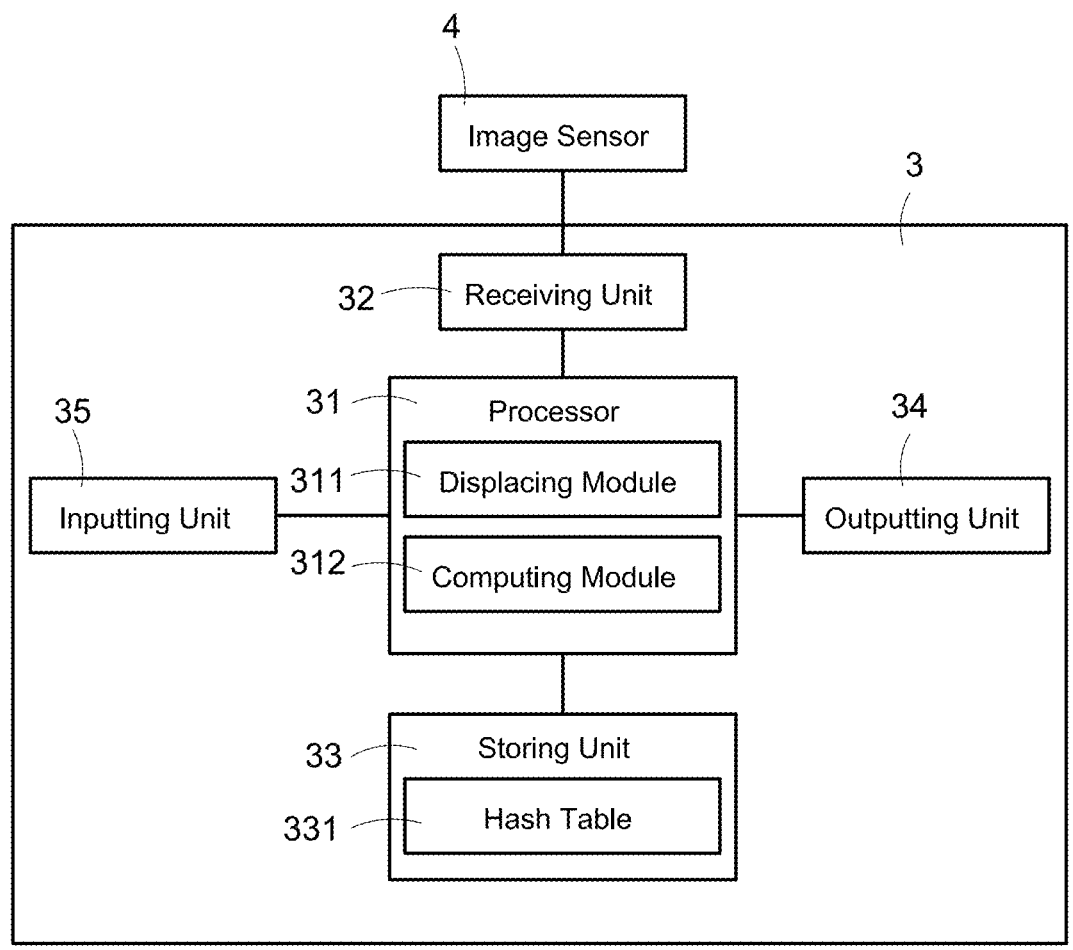
FIG. 2 is a block diagram of a calibrating device of a first embodiment according to the present disclosure.

Please refer to FIG. 2, which is a block diagram of a calibrating device of a first embodiment according to the present disclosure. The present disclosure relates to a calibrating device used to calibrate a real-time image through a dithering process (referred to as the calibrating device 3 hereinafter). The calibrating device 3 may be used when an image is transformed between a high resolution and a low resolution. In particular, the calibrating device 3 calibrates a transformed image through the dithering process, and then outputs a calibrated image. The dithering process in this embodiment is performed to respectively add a corresponding hash value that is randomly generated to each of a plurality of pixel points of the image, so as to eliminate a quantization error produced when the image is transformed, and smooth the outputted sequential images.

In the following description, the real-time image may be used to mean one image (frame) that is currently received and processed. In other words, sequential images are continuously received by the calibrating device 3, and the currently received and processed image may be the real-time image.

As disclosed in FIG. 2, the calibrating device 3 includes a processor 31, a receiving unit 32, a storing unit 33, and an outputting unit 34, wherein the processor 31 is electrically connected with the receiving unit 32, the storing unit 33, and the outputting unit 34, and the processor 31 integrates and controls each of the units 32-34.

In one embodiment, the processor 31 may be a micro control unit (MCU), a central process unit (CPU), a grid programmable gate array (FPGA), or an application specific integrated circuit (ASIC). The processor 31 records computer readable program codes. After executing the computer readable program codes, the processor 31 may implement each function required by the calibrating device 3 of the present disclosure.

According to the function implemented by the processor 31, the calibrating device 3 virtually generates multiple function modules inside the processor 31, which include a displacing module 311 and a computing module 312 (detailed discussed in the following). In this embodiment, the displacing module 311 and the computing module 312 are software modules implemented by the processor 31 through executing the computer readable program codes, but not limited thereto.

In one embodiment, the receiving unit 32 may be a connector; for example, a universal serial bus (USB) connector, a serial peripheral interface (SPI) connector, a low-voltage differential signaling (LVDS) connector, a mobile industry processor interface (MIPI) connector, etc., but not limited thereto. The calibrating device 3 connects an external image sensor 4 through the receiving unit 32, so as to receive and process a real-time image sensed and produced by the image sensor 4. More specific, the image sensor 4 is activated to continuously sense an external environment and produce multiple images in sequence (also referred to as sequential images). After the calibrating device 3 is activated, the calibrating device 3 may continuously receive the sequential images produced by the image sensor 4 through the receiving unit 32.

The calibrating device 3 of the present disclosure calibrates the image through the dithering process. The dithering process in this embodiment is performed to respectively add a corresponding hash value that is randomly obtained to each of a plurality of pixel points of the image, so as to smooth the sequential images. For the above purpose, the calibrating device 3 adjusts the hash values being used to add to the pixel points in accordance with a time parameter of the real-time image to be currently adjusted. Therefore, same pixel point from a previous image and a later image of the sequential images may be prevented from being added with same hash value, thus the calibration effect of the dithering process may be increased. In order to do so, the receiving unit 32 may record the time parameter of the real-time image while receiving the real-time image.

In one embodiment, the time parameter is a frame count of the real-time image currently received. Because only one image frame may be received by the receiving unit 32 at a time, the time parameter of different image frames should be different. In another embodiment, the time parameter is a time-counting or a clock with respect to the time when the image sensor 4 produced the real-time image, but not limited thereto.

The image sensor 4 may be, for example, a camera, an infrared sensor, a laser sensor, etc., and the image sensor 4 is used to sense external images in real-time and import the sensed images to the calibrating device 3 for analysis, calibration, and outputting. In one embodiment, the image sensor 4 may be, for example but not limited to, a medical endoscope used to sense human body images.

The storing unit 33 may be, for example but not limited to, a hard-drive disk (HDD), a solid-state disk (SSD), a flash memory, a read only memory (ROM), a random-access memory (RAM), a non-volatile memory, etc. The storing unit 33 pre-stores a hash table 331, wherein the hash table 331 records multiple hash values used to respectively calibrate multiple pixel points of the image.

Figure 4:
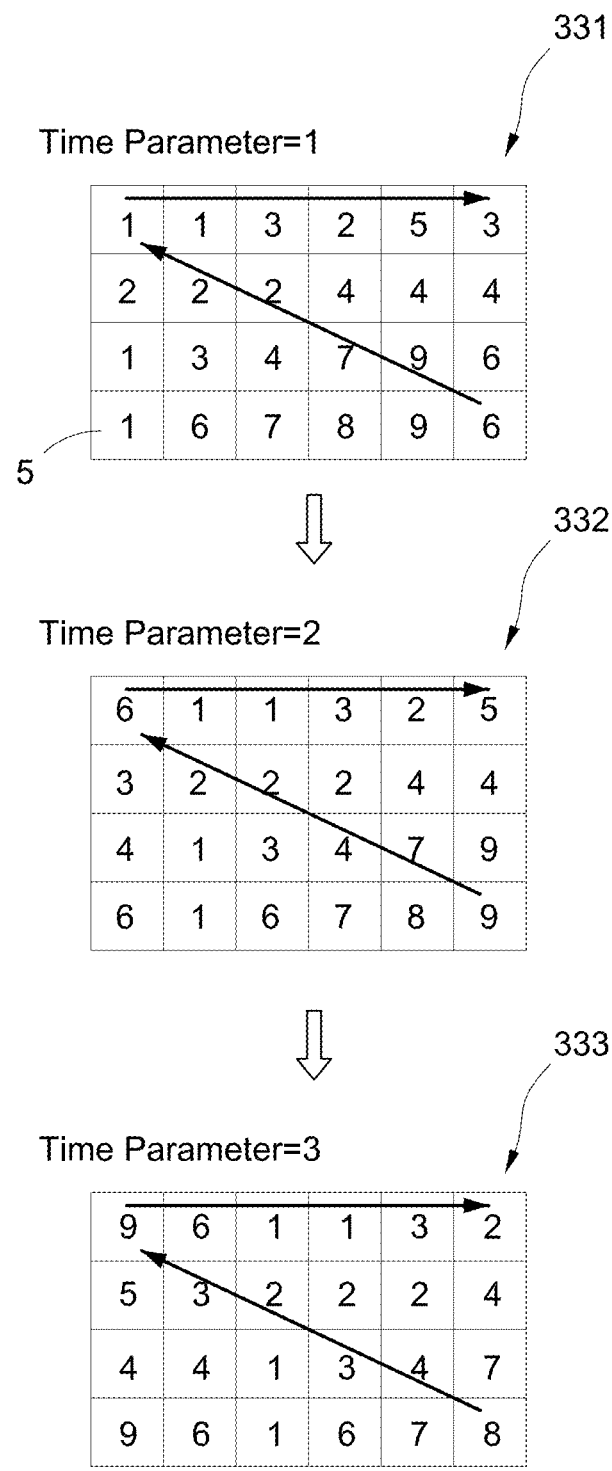
FIG. 4 is a schematic diagram of adjusting a hash table of a first embodiment according to the present disclosure.

In one embodiment, a user may use an algorithm to generate multiple hash values and an arrangement order of the multiple hash values based on a demanded specification, and generates the hash table 331 based on the multiple hash values and the arrangement order of the multiple hash values. In particular, the hash table 331 is a tabulation construed by multiple rows and multiple columns, and each of the hash values is respectively recorded in a corresponding grid of the hash table 331 according to the arrangement order (as shown in FIG. 4).

In the present disclosure, the calibrating device 3 calibrates the real-time image and produces a calibrated image through the processor 31, and outputs the calibrated image through the outputting unit 34. In one embodiment, the outputting unit 34 may be an image output port; for example, a high definition multimedia interface (HDMI) port, a serial digital interface port, etc. The calibrating device 3 connects with an external displayer to display the calibrated image through the outputting unit 34. In another embodiment, the outputting unit 34 may be a displayer arranged on the calibrating device 3, so the calibrating device 3 may directly display the calibrated image through the outputting unit 34. However, the above description is only one of the exemplary embodiments of the present disclosure, but not limited thereto.

The displayer may be a medical displayer, which is used to display the real-time image sensed and produced by the image sensor 4 (such as a medical endoscope).

If the color depth of the image (e.g., six bits) produced by the image sensor 4 is smaller than that of the displayer (e.g., eight bits), the calibrating device 3 needs to perform an upgrading process to the image before outputting the image. After the upgrading process, a hash value is added to a lower bit of the upgraded image, so as to eliminate the quantization error produced due to the upgrading process.

For example, the pixel value of one pixel point of an image is "20", which is "010100" when being expressed in six-bit binary. When the upgrading process is performed to the image to upgrade the number of bits of the image to eight bits, the pixel value of the pixel point may be changed to "80", which is "01010000" when being expressed in eight-bit binary. In the present disclosure, the calibrating device 3 may obtain a hash value correspondingly from the hash table

331 after the upgrading process, such as "0", "1", "2", and "3", which are "00", "01", "10", and "11" when being expressed in two-bit binary. Therefore, the calibrating device 3 adds the obtained hash value to a lowest bit of the pixel value of the pixel point, so as to transform the pixel value of the pixel point into one of "80" (i.e., "01010000" in eight-bit binary), "81" (i.e., "01010001" in eight-bit binary), "82" (i.e., "01010010" in eight-bit binary), and "83" (i.e., "01010011" in eight-bit binary).

If the color depth of the image (e.g., ten bits) produced by the image sensor 4 is larger than that of the displayer (e.g., eight bits), the calibrating device 3 needs to perform a downgrading process to the image before outputting the image. After the downgrading process, a hash value is added to a lower bit of the downgraded image, so as to eliminate the quantization error produced due to the downgrading process.

For example, the pixel value of one pixel point of an image is "320", which is "0101000000" when being expressed in ten-bit binary. When the downgrading process is performed to the image to downgrade the image to eight bits, the pixel value of the pixel point may be changed to "80", which is "01010000" when being expressed in eight-bit binary. In the present disclosure, the calibrating device 3 may obtain a hash value correspondingly from the hash table 331 after the downgrading process, such as "0", "1", "2", and "3", which are "00", "01", "10", and "11" when being expressed in two-bit binary. Therefore, the calibrating device 3 adds the obtained hash value to a lower bit of the pixel value of the pixel point, so as to transform the pixel value of this pixel point into one of "80" (i.e., "01010000" in eight-bit binary), "81" (i.e., "01010001" in eight-bit binary), "82" (i.e., "01010010" in eight-bit binary), and "83" (i.e., "01010011" in eight-bit binary).

In the embodiment discussed above, the provided solution adds different hash values to same pixel point of different images sequentially received. In doing so, when the images are sequentially displayed, a visual persistence effect of human eyes may appear to achieve the effect of repeated flashing images; for example, the pixel value of same pixel point may change continuously among "80", "81", "82", and "83" in the sequential images. Therefore, the outputting images may reach a higher resolution. However, the above description is only one of the exemplary embodiments of the present disclosure, but not limited thereto.

As discussed above, the present disclosure uses the dithering process of color spaces to achieve the visual persistence effect; hence, the calibrating device 3 needs to ensure that the pixel value of same pixel point from multiple time-adjacent images are respectively calibrated based on different hash values.

As mentioned, the processor 31 may execute the computer readable program codes to virtually form the displacing module 311 and the computing module 312. The displacing module 331 obtains the time parameter of the real-time image currently received from the receiving unit 32, and obtains the hash table 331 from the storing unit 33. Then, the displacing module 311 shifts the multiple hash values in the hash table 331 in accordance with the time parameter to generate an adjusted hash table. In the present disclosure, the arrangement order of the multiple hash values in the adjusted hash table is positively related to the time parameter of the real-time image, and the processor 31 calibrates the real-time image (i.e., performs the dithering process to the real-time image) in accordance with the adjusted hash table.

The computing module 312 obtains the coordinates of each pixel point in the real-time image, and obtains a corresponding one of the hash values from a corresponding grid of the adjusted hash table based on the coordinates of each pixel point. Next, the computing module 312 respectively adds the corresponding hash value to the lowest bit of the pixel value of each pixel point, so as to generate multiple calibrated pixel points, and then generate a calibrated image in accordance with the multiple calibrated pixel points. Then, the processor 31 transmits the calibrated image to the outputting unit 34, and the outputting unit 34 outputs the calibrated image.

In the embodiment, the number of bits of the calibrated image is different from the number of bits of the real-time image, and the number of bits of the calibrated image is compelling with the specification of the displayer (or the outputting unit 34). Even though the calibrated image is upgraded or downgraded, it is smooth visually to human's eyes since each of the calibrated images is performed with the dithering process.

Figure 3:
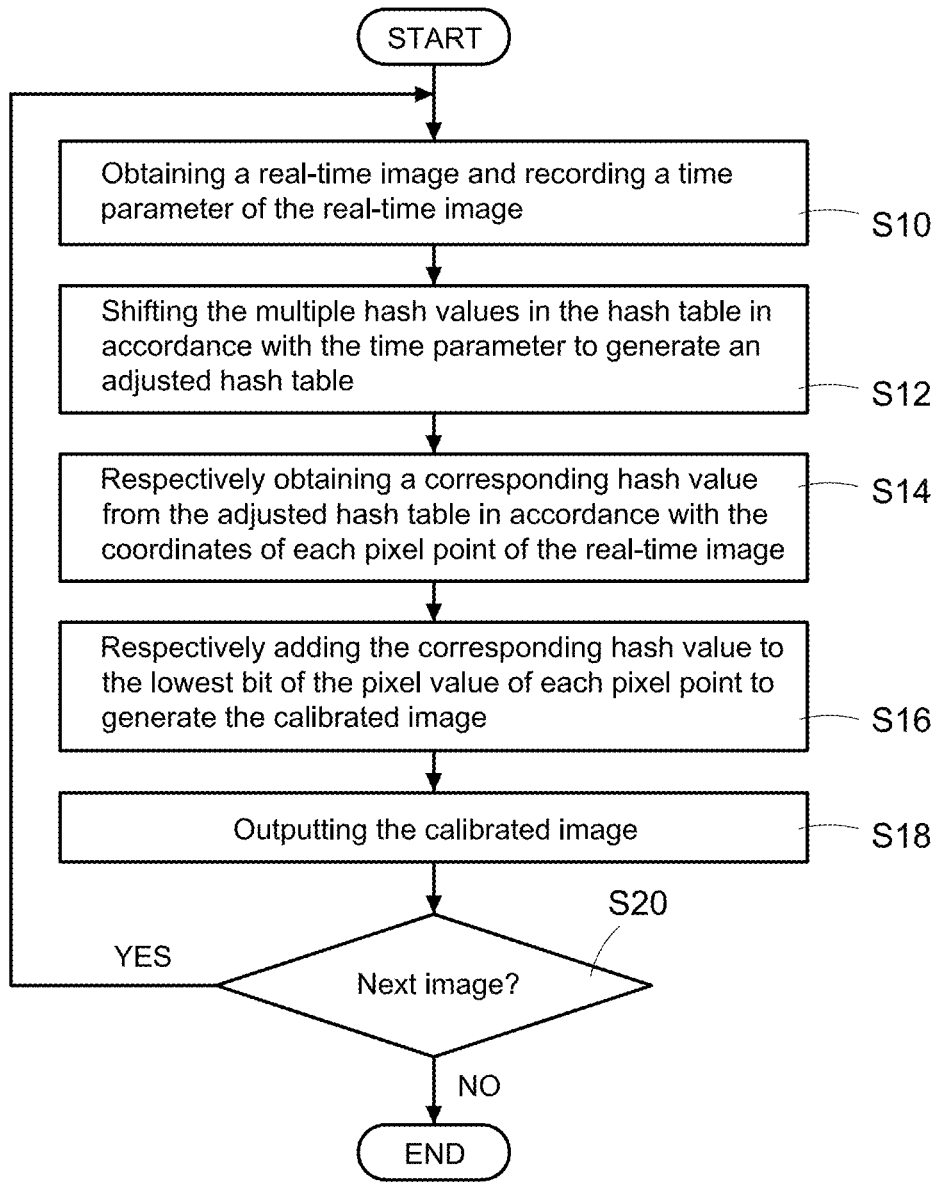
FIG. 3 is a flowchart of a calibrating method of a first embodiment according to the present disclosure.

Please refer to FIG. 2 and FIG. 3, wherein FIG. 3 is a flowchart of a calibrating method of a first embodiment according to the present disclosure. The present disclosure further discloses a calibrating method of calibrating a real-time image through a dithering process (referred to as the calibrating method hereinafter). The calibrating method is incorporated with the calibrating device 3 as shown in FIG. 2. In other words, the calibrating device 3 may perform the calibrating method to implement the dithering process to calibrate the real-time image.

First, the calibrating device 3 obtains a real-time image from the image sensor 4 connected therewith, and records a time parameter of the real-time image (step S10). Also, the processor 31 of the calibrating device 3 reads the hash table 331 from the storing unit 33, and shifts the multiple hash values in the hash table 331 in accordance with the time parameter to generate an adjusted hash table (step S12). The hash table 331 is a tabulation construed by multiple rows and multiple columns, and the multiple hash values are respectively recorded in each corresponding grid of the tabulation.

In one embodiment, the time parameter of the real-time image is a frame count of the real-time image. In the step S10, the calibrating device 3 determines the frame count of the real-time image currently received out of the sequential images through the receiving unit 32 or the processor 31. In other words, the calibrating device 3 determines which frame the real-time image currently received is with respect to the sequential images. In the step S12, the processor 31 performs a horizontal displacement, a vertical displacement, or the combination to the multiple hash values in the hash table 331 in accordance with the frame count of the real-time image (such as a first frame, a second frame, a third frame, etc.).

Through shifting the positions of the multiple hash values in the hash table 331, the same pixel point of multiple time-adjacent images may be prevented from being calibrated by using same hash value. In another situation, even if same pixel point of multiple time-adjacent images are calibrated by using same hash value, the number of the calibration that calibrates the same pixel point with same hash value may not exceed a threshold, so the calibrated image may be still acceptable to user's bare eyes.

In another embodiment, the time parameter of the real-time image is a time-counting or a clock of the image sensor 4. In the step S10, the calibrating device 3 senses a current time-counting or a current clock of the image sensor 4 through the receiving unit 32 or the processor 31. In the step S12, the processor 31 performs the horizontal displacement, the vertical displacement, or the combination to the multiple hash values in the hash table 331 in accordance with the time-counting or the clock.

After the step S12, the processor 31 obtains coordinates of each pixel point in the real-time image, and obtains a corresponding one of the hash values from a corresponding grid of the adjusted hash table in accordance with each obtained coordinates (step S14). Through the step S14, the processor 31 may associate each of the multiple pixel points of the real-time image with one of the multiple hash values. Also, the processor 31 respectively adds a corresponding hash value to the lowest bit of the pixel value of each pixel point of the real-time image, so as to generate the calibrated image (step S16). In one embodiment, the pixel value of each pixel point is expressed in binary. In this embodiment, the processor 31 in the step S16 transforms each of the hash values into binary and then adds the transformed hash value to the lowest bit of the pixel value of the corresponding pixel point.

Figure 1:
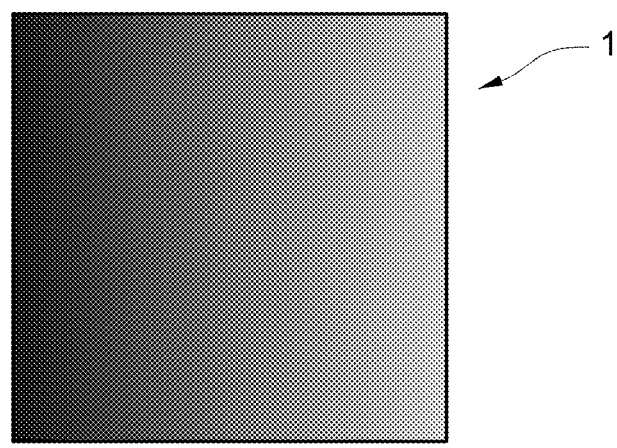
FIG. 1 is a schematic diagram showing a banding effect.
Figure 1:
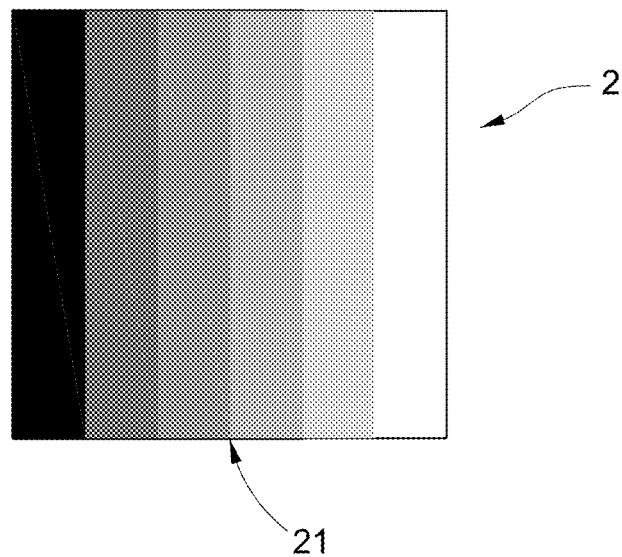

It should be mentioned that the dithering process is performed to eliminate the quantization error produced due to a transformation between a high resolution and a low resolution. That is to say, the calibrating device 3 and the calibrating method of the present disclosure may perform the dithering process not only when the real-time image needs to be performed with a quantization error elimination process (such as the upgrading process or the downgrading process) but also the visual fault 21 as shown in FIG. 1 appears on the processed image.

In the present disclosure, the calibrating device 3 determines whether to perform the upgrading process (i.e., to increase the number of bits of the real-time image) or the downgrading process (i.e., to reduce the number of bits of the real-time image) based on a difference between the color depth of the real-time image and the color depth of the displayer. If the upgrading process or the downgrading process is needed, the calibrating device 3 may perform the upgrading process or the downgrading process to the real-time image at an arbitrary time point between the step S10 and the step S16, so as to obtain a processed image. In particular, the calibrating device 3 may perform the upgrading process to the real-time image through the computing module 312 of the processor 31 to increase the number of bits of the pixel value of each pixel point of the real-time image. On the other hand, the calibrating device 3 may perform the downgrading process to the real-time image through the computing module 312 to reduce the number of bits of the pixel value of each pixel point of the real-time image.

It should be mentioned that, in the upgrading process, the processor 31 adds a preset number of bits to the lowest bit of the pixel value of each pixel point; in the downgrading process, the processor 31 deletes a preset number of bits from the lowest bit of the pixel value of each pixel point. In the step S16, the processor 31 respectively adds a corresponding hash value to the lowest bit of the pixel value of each pixel point of the processed image, so as to generate the calibrated image.

After the step S16, the calibrating device 3 outputs the calibrated image through the outputting unit 34 (step S18), wherein, the color depth of the calibrated image is compelling with the specification of the displayer or the outputting unit 34 used to output the calibrated image.

After the step S18, the processor 31 determines whether to perform the dithering process to a next image (step S20). In other words, the processor 31 determines whether the calibrating device 3 is turned off, or whether the image sensor 4 stops transmitting images. If the determination of the step S20 is negative, the processor 31 re-executes the step S10 to the step S18 to perform the dithering process to the next image. Therefore, the calibrating device 3 may output smooth sequential images.

Please refer to FIG. 2, FIG. 3, and FIG. 4 at the same time, wherein FIG. 4 is a schematic diagram of adjusting a hash table of a first embodiment according to the present disclosure. As disclosed in FIG. 4, the hash table 331 is a tabulation construed by multiple rows and multiple columns, and the multiple hash values 5 are respectively recorded in the tabulation. As discussed above, different images have different time parameters, so the processor 31 uses different hash tables 331 with different contents to calibrate different images that are obtained at different time points (i.e., different real-time images).

As shown in FIG. 4, the time parameter of a first image is 1, wherein the first image may be a first frame of the sequential images, or an image sensed by the image sensor 4 corresponding to 0.01 ms of the image sensor 4. In this case, the processor 31 does not adjust the hash table 331. Instead, the processor 31 directly calibrates the first image in accordance with the content of the pre-stored hash table 331.

The time parameter of a second image is 2, wherein the second image may be a second frame of the sequential images, or an image sensed by the image sensor 4 corresponding to 0.02 ms of the image sensor 4. In this case, the processor 31 performs a horizontal displacement and/or a vertical displacement to the multiple hash values 5 in the hash table 331 to generate an adjusted hash table 332. Then, the processor 31 calibrates the second image in accordance with the content of the adjusted hash table 332. In this embodiment, the processor 31 performs the horizontal displacement for one unit to all hash values 5 in the hash table 331 (moving every hash value 5 for one grid to the right is exemplified in FIG. 4), and then performs the vertical displacement for one unit to all hash values 5 at the first row (moving every hash value 5 at the first row up for one grid is exemplified in FIG. 4), so as to generate the adjusted hash table 332.

The time parameter of a third image is 3, wherein the third image may be a third frame of the sequential images, or an image sensed by the image sensor 4 corresponding to 0.03 ms of the image sensor 4. In this case, the processor 31 performs a horizontal displacement and/or a vertical displacement to the multiple hash values 5 in the adjusted hash table 332 to generate another adjusted hash table 333. Then, the processor 31 calibrates the third image in accordance with the content of the adjusted hash table 333. In this embodiment, the processor 31 performs the horizontal displacement for one unit to all hash values 5 in the adjusted hash table 332, and then performs the vertical displacement for one unit to all hash values 5 at the first row, so as to generate the adjusted hash table 333.

In the embodiment of FIG. 4, the value, the arrangement order, and the displacing direction of each of the hash values 5 are only provided for examples without the intention to limit the scope of the present disclosure.

The multiple hash values and the arrangement order in the hash table 331 may be pre-determined. When performing the dithering process, the processor 31 may respectively calibrate multiple position-adjacent pixel points in same image by using different hash values 5. Therefore, the multiple position-adjacent pixel points in the calibrated image may have little differences compared with each other. As a result, when the user looks at the calibrated image, the user won't see the visual fault appeared on the calibrated image, so the purpose of performing the dithering process may be achieved.

More specific, the multiple hash values 5 of the hash table 331 may be generated through a random number generator. Before using the random number generator, the user may preset the random number generator, so the generated random numbers (i.e., the multiple hash values 5) may have a preset characteristic(s). For an example, two hash values 5 adjacent in the hash table 331 should be different. For another example, the amount of one or more of the hash values 5 adjacent in the hash table 331 having a same value is below a threshold.

The following description is exemplified by performing the dithering process through adding a two-bit hash value.

For example, the hash table 331 may be preset to record multiple hash values 5 of "2", "0", "1", and "3" (which are "10", "00", "01", and "11" when being expressed in two-bit binary) in the first row. When the image sensor 4 performs a horizontal scanning and inputs a first valid horizontal line of a real-time image to the calibrating device 3, the processor 31 inquires the first row of the hash table 331 and calibrates each pixel point of the first valid horizontal line by using the hash values 5 of the first row in an order which is "2", "0", "1", "3", "2", "0", "1", "3", "2", "0", "1", "3", . . . , etc. For another example, the second row of the hash table 331 may record multiple hash values 5 of "0", "1", "3", and "2" (which are "00", "01", "11", and "10" when being expressed in two-bit binary). When the image sensor 4 performs the horizontal scanning and inputs a second valid horizontal line of the real-time image to the calibrating device 3, the processor 31 inquires the second row of the hash table 331 and calibrates each pixel point of the second valid horizontal line by using the hash values 5 of the second row in an order which is "0", "1", "3", "2", "0", "1", "3", "2", "0", "1", "3", "2", . . . , etc.

When the image sensor 4 performs a vertical scanning to the image, the processor 31 may apply a similar processing logic to the above description of the horizontal scanning, which is to obtain corresponding hash values 5 from the hash table 331 to calibrate each pixel point of the image in an order by using the obtained hash values 5. Therefore, the calibrated image may be ensured to present the technical effect of the present disclosure.

However, the above description is only one of the exemplary embodiments of the present disclosure, but not limited thereto.

Being restricted by the capacity of the storing unit 31 of the calibrating device 3, the amount of the multiple hash values 5 in the hash table 331 may be less than the total amount of the pixel points of the real-time image. In one embodiment, the calibrating device 3 determines which hash value 5 in the hash table 331 (or the adjusted hash table 332, 333) should be used to calibrate a pixel point in the real-time image in accordance with the position of this pixel point in the real-time image.

Figure 5:
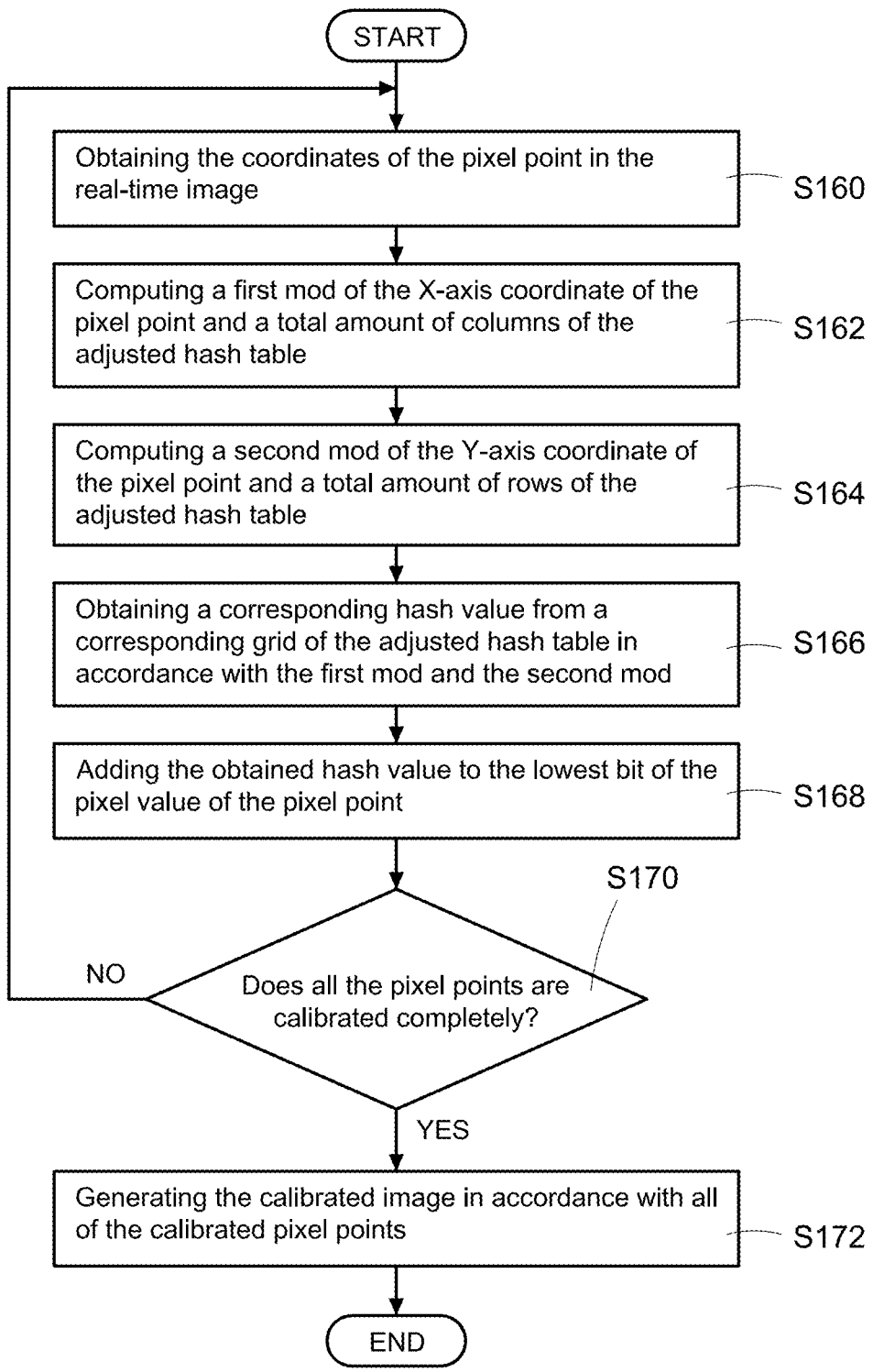
FIG. 5 is a flowchart of image calibration of a first embodiment according to the present disclosure.

Please refer to FIG. 2, FIG. 3, and FIG. 5, wherein FIG. 5 is a flowchart of image calibration of a first embodiment according to the present disclosure. FIG. 5 is provided to interpret how the calibrating device 3 obtains corresponding hash values 5 to respectively calibrate each pixel point of the real-time image in the step S16 of FIG. 3.

First, the processor 31 reads one of the multiple pixel points from the currently received real-time image through the computing module 312, and obtains the coordinates of the pixel point in the real-time image (step S160). The coordinates includes an X-axis coordinate and a Y-axis coordinate of the pixel point on a coordinate system applied by the real-time image. In one embodiment, the coordinates indicate the position of the pixel point located in the real-time image. For example, if the coordinates of a first pixel point is (5,5), it means that the first pixel point is located at a position of fifth row, fifth column of the real-time image. If the coordinates of a second pixel point is (101,100), it means that the second pixel point is located at a position of 101th row, 100th column of the real-time image, and so on.

Next, the computing module 312 computes a first mod of the X-axis coordinate of the pixel point and a total amount of columns of the adjusted hash table (step S162), and also computes a second mod of the Y-axis coordinate of the pixel point and a total amount of rows of the adjusted hash table (step S164). Next, the computing module 312 obtains a corresponding one of the hash values from a corresponding grid of the adjusted hash table in accordance with the first mod and the second mod (step S166), and adds the obtained hash value to the lowest bit of the pixel value of the pixel point (step S168).

As shown in FIG. 4, the hash table 331 of the present disclosure is a tabulation construed by multiple rows and multiple columns. In comparison with the hash table 331, the arranged positions of the multiple hash values 5 in the adjusted hash tables 332, 333 are different from that of the multiple hash values 5 in the hash table 331. However, the size, the total amount of rows, and the total amount of columns of the adjusted hash tables 332, 333 are same as that of the hash table 331.

The following description takes the real-time image currently processed to be a third frame image as an example. The processor 31 may obtain the adjusted hash table 333 through the computing module 312, and the computing module 312 obtains the coordinates of one of the pixel points of the real-time image. For the sake of understanding, a pixel point with the coordinates of (101,100) is taken as an example. First, the computing module 312 computes a first mod of the X-axis coordinate (i.e., "101") and the total amount of columns of the adjusted hash table 333 (i.e., "6"). Hence, the first mod is computed as "5" (i.e., 101 mod 6=5). Also, the computing module 312 computes a second mod of the Y-axis coordinate (i.e., "100") and the total amount of rows of the adjusted hash table 333 (i.e., "4"). Hence, the second mod is computed as "0" (i.e., 100 mod 4=0).

It should be mentioned that the size of the hash table 331 is same as that of the adjusted hash tables 332, 333, so the computing module 312 may perform the mod computation based on the total amount of columns and rows of any of the hash tables 331, 332, and 333. Further, the processor 31 may perform the mod computation after the adjusted hash tables 332, 333 are generated, or the processor 31 may generate the adjusted hash tables 332, 333 after the mod computation is performed based on the hash table 331.

Therefore, the computing module 312 may obtain a hash value 5 from a specific grid of (5,0) of the adjusted hash table 333 in accordance with the first mod and the second mod. In the embodiment of FIG. 4, the obtained hash value 5 is "2", which is "10" when being expressed in binary. In the step S168 of FIG. 5, the computing module 312 adds this hash value 5, which is "10" in binary, to the lowest bit of the pixel value of the pixel point, so as to complete the calibration to this pixel point. If the obtained hash value 5 is larger than "3", which is beyond the range that can be represented by two-bit binary, the computing module 312 needs more bits to represent the hash value 5 and to add the hash value 5 to the lowest bit of the pixel value of the pixel point.

On the other hand, if the hash value 5 is beyond the range that can be represented by two-bit binary, but the quantization error of the real-time image is less serious, the computing module 312 may retrieve only the last two bits of the hash value 5 to calibrate the pixel point. For example, if the hash value 5 being obtained is "6" (which is "110" when being expressed in binary), the computing module 312 may retrieve only the last two bits (which is "10" in binary) to calibrate the pixel value of this pixel point. However, the above description is only a part of the exemplary embodiments of the present disclosure, but not limited thereto.

In one embodiment, the hash values 5 may be recorded in the hash table 331 in the binary format. In another embodiment, the hash values 5 may be recorded in the hash table 331 in the decimal format. If the hash values 5 are recorded in the hash table 331 in the decimal format, then in the step S168 discussed above, the computing module 132 first transforms the hash value 5 obtained from the step S166 into the binary format, and then adds the transformed hash value 5 to the lowest bit of the pixel value of the pixel point.

After the step S168, the processor 31 determines whether all the pixel points of the real-time image are calibrated completely (step S170). If any of the pixel points is not yet processed, the processor 31 re-executes the step S160 to the step S168 to calibrate another pixel point of the real-time image. If all of the pixel points of the real-time image are calibrated completely, the processor 31 generates the calibrated image in accordance with all of the calibrated pixel points (step S172).

It should be mentioned that the present disclosure only performs the calibration as shown in FIG. 3 when the quality of the image has to be improved. Therefore, the overall resource consumption of the image processing system (not shown) may be reduced. For example, the present disclosure may perform the calibration to the image only when a serious quantization error is produced on the image after the image is transformed between a high resolution and a low resolution. For another example, the present disclosure may perform the calibration to an original image when the original image itself has a serious color hierarchy difference (such as the visual fault 21 as shown in FIG. 1).

In one embodiment, the calibrating device 3 may include an inputting unit (such as the inputting unit 35 as shown in FIG. 2) connected with the processor 31. The inputting unit 35 may be, for example but not limited thereto, a human machine interface (HMI), such as a button, a touch pad, etc.

In the embodiment, the user may keep checking the real-time image formed and outputted by the image sensor 4 from the displayer connected to the calibrating device 3. When the user determines that the real-time image is abnormal, such as the visual fault 21 as shown in FIG. 1 appears on the real-time image, the user may triggers the inputting unit 35 manually. In this embodiment, the calibrating device 3 may control the processor 31 to execute the steps shown in FIG. 3 and FIG. 5 after the inputting unit 35 is triggered to perform the dithering process to the real-time image, so as to eliminate the unusual phenomenon of the real-time image produced due to the quantization error.

In another embodiment, the calibrating device 3 may keep analyzing the content of the real-time image through the processor 31 while receiving and outputting the real-time image formed by the image sensor 4, and the calibrating device 3 automatically determines whether to perform the dithering process to the real-time image or not.

In particular, the processor 31 respectively samples every image of the sequential images, and calculates a standard deviation of the pixel values of multiple pixel points located at multiple specific ranges of same image. Taking a 3*3 range construed by nine pixel points as an example, the processor 31 may calculate the standard deviation of the pixel values of the nine pixel points. In this embodiment, the processor 31 may sample multiple specific ranges from the same image. If the amount of one or more of the specific ranges in the image that have a small deviation exceeds a pre-determined amount, the processor 31 may determine that the following image(s) needs to be performed with the dithering process for calibration.

As discussed above, when a calculation result of the standard deviation is compelling with an activated condition, such as the amount of the specific range that has a small standard deviation exceeds the pre-determined amount, the processor 31 may determine that the quantization error of the image is severe, and automatically execute the steps shown in FIG. 3 and FIG. 5 to perform the dithering process to the real-time image. For example, the the processor 31 may determine that the activated condition is satisfied when the standard deviations of ten specific ranges out of twenty sampled specific ranges are smaller than a preset threshold.

It should be mentioned that, the analysis result may be inaccurate if the dithering process is performed right after one single image is determined to compel with the activated condition. Therefore, in another embodiment, the processor 31 may start to perform the dithering process only if the calculation results of the standard deviations of multiple continuous images are compelling with the activated condition.

However, the above description is only one of the exemplary embodiments of the present disclosure. If the image content sensed by the image sensor 4 is different, the pre-determined threshold may be different as well. For example, the object sensed by the image sensor 4 may have same or similar color on multiple portions, such as the object itself is a piece of copper foil. In this scenario, the pixel values of multiple pixel points of the real-time image may be very close to each other. Therefore, the calibrating device 3 should lower the pre-determined threshold in order to prevent a misjudgment.

For example, the standard deviation of the specific range for a normal image may be 100, and it may be reduced to 80 when the quantization error is produced. Therefore, the pre-determined threshold may be considered to 85. If the sensed object is the copper foil, the standard deviation of the specific range for its image may be only 60, and it may be reduced to 50 or even lower when the quantization error is produced. In such scenario, the pre-determined threshold needs to be reduced (for example, reduces from 85 to 55), so as to prevent the calibrating device 3 from the misjudgment.

The calibrating device 3 and calibrating method of the present disclosure may adjust the content of the hash table in accordance with the time parameter of the real-time image, so the random hash values may be generated and used more effective to perform the dithering process to the real-time image. In conclusion, the random calculation may be implemented without consuming huge hardware resources, thus may be implemented on the hardware of simple structure and low cost.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A calibrating device of calibrating a real-time image through a dithering process, comprising:

a receiving unit, connected with an image sensor, configured to receive the real-time image from the image sensor and record a time parameter of the real-time image;

a storing unit, stored a hash table, wherein the hash table records multiple hash values used to calibrate multiple pixel points of the real-time image;

a processor, connected with the receiving unit and the storing unit, comprising:

a displacing module, configured to shift the multiple hash values in the hash table in accordance with the time parameter to generate an adjusted hash table; and a computing module, configured to respectively obtain a corresponding one of the hash values from a corresponding grid of the adjusted hash table for each pixel point of the real-time image in accordance with a coordinates of each pixel point, and respectively add the corresponding one of the hash values to a lowest bit of a pixel value of each pixel point to generate a calibrated image; and an outputting unit, connected with the processor, configured to output the calibrated image.

2. The calibrating device in claim 1, wherein the time parameter is a frame count of the real-time image, or a time-counting or a clock of the image sensor.

3. The calibrating device in claim 1, wherein the hash table is a tabulation construed by multiple rows and multiple columns, the multiple hash values are respectively recorded in each grid of the tabulation, the computing module is configured to respectively compute a first mod of an X-axis coordinate of each of the pixel points and a total amount of columns of the adjusted hash table, to respectively compute a second mod of a Y-axis coordinate of each of the pixel points and a total amount of rows of the adjusted hash table, and to respectively obtain the corresponding one of the hash values for each pixel point from the corresponding grid of the adjusted hash table in accordance with the first mod and a second mod.

4. The calibrating device in claim 1, wherein the displacing module is configured to perform a horizontal displacement or a vertical displacement to the multiple hash values in the hash table in accordance with the time parameter, wherein a displacement amount of the horizontal displacement and the vertical displacement are positively related to the time parameter.

5. The calibrating device in claim 1, wherein the computing module is configured to perform an upgrading process or a downgrading process to the real-time image to increase or to reduce the number of bits of the real-time image, and to respectively add each of the obtained hash value to the lowest bit of the pixel value of each of the pixel points of the real-time image to generate the calibrated image.

6. A calibrating method of calibrating a real-time image through a dithering process, comprising:
  a) obtaining the real-time image through an image sensor and recording a time parameter of the real-time image;
  b) reading a hash table, wherein the hash table records multiple hash values used to calibrate multiple pixel points of the real-time image;
  c) shifting the multiple hash values in the hash table in accordance with the time parameter to generate an adjusted hash table;
  d) respectively obtaining a corresponding one of the hash values from a corresponding grid of the adjusted hash table for each pixel point of the real-time image in accordance with a coordinates of each pixel point;
  e) respectively adding the corresponding one of the hash values to a lowest bit of a pixel value of each of the pixel points to generate a calibrated image; and
  f) outputting the calibrated image.

7. The calibrating method in claim 6, wherein the time parameter is a frame count of the real-time image, or a time-counting or a clock of the image sensor.

8. The calibrating method in claim 6, wherein the hash table is a tabulation construed by multiple rows and multiple columns, the multiple hash values are respectively recorded in each grid of the tabulation, and the step d) comprises:
  d1) respectively obtaining the coordinates of each of the pixel points in the real-time image, wherein the coordinates comprises an X-axis coordinate and a Y-axis coordinate;
  d2) computing a first mod of the X-axis coordinate and a total amount of columns of the adjusted hash table;
  d3) computing a second mod of the Y-axis coordinate and a total amount of rows of the adjusted hash table; and
  d4) obtaining the corresponding one of the hash values from the corresponding grid of the adjusted hash table in accordance with the first mod and a second mod.

9. The calibrating method in claim 6, wherein the step c) comprises performing a horizontal displacement or a vertical displacement to the multiple hash values in the hash table in accordance with the time parameter, wherein a displacement amount of the horizontal displacement and the vertical displacement are positively related to the time parameter.

10. The calibrating method in claim 6, further comprising a step e0) before the step e): performing an upgrading process or a downgrading process to the real-time image to increase or to reduce the number of bits of the real-time image and generated a processed image;
  wherein, the step e) comprises respectively adding each of the obtained hash values to the lowest bit of the pixel value of each of the pixel points of the processed image to generate the calibrated image.

* * * * *